United States Patent
Eisenhardt

(10) Patent No.: US 11,458,608 B2
(45) Date of Patent: Oct. 4, 2022

(54) STAKE IMPLANTING TOOL

(71) Applicant: Grant Eisenhardt, Columbus, MI (US)

(72) Inventor: Grant Eisenhardt, Columbus, MI (US)

( * ) Notice: Subject to any disclaimer, the term of this patent is extended or adjusted under 35 U.S.C. 154(b) by 0 days.

(21) Appl. No.: 17/212,094

(22) Filed: Mar. 25, 2021

(65) Prior Publication Data

US 2021/0299838 A1    Sep. 30, 2021

Related U.S. Application Data

(60) Provisional application No. 62/994,394, filed on Mar. 25, 2020.

(51) Int. Cl.
*B25C 5/11* (2006.01)
*B25C 3/00* (2006.01)

(52) U.S. Cl.
CPC .............. *B25C 5/11* (2013.01); *B25C 3/006* (2013.01)

(58) Field of Classification Search
CPC ........... E02D 17/20; E02D 7/04; E04H 17/26; E04H 17/261; E04H 17/263; B25D 1/16; B25C 1/02; B25C 5/11; B25C 3/006
See application file for complete search history.

(56) References Cited

U.S. PATENT DOCUMENTS

| | | | | |
|---|---|---|---|---|
| 2,629,985 A | * | 3/1953 | McDowell | E04H 17/263 173/91 |
| 4,627,563 A | * | 12/1986 | Meyer | B25C 5/13 227/120 |
| 4,706,864 A | | 11/1987 | Jacobsen et al. | |
| 5,097,912 A | * | 3/1992 | Bowers | E04H 12/2269 173/90 |
| 5,343,667 A | * | 9/1994 | Peden | E04G 17/06 249/219.1 |
| 6,450,388 B1 | * | 9/2002 | Denton | E01B 29/24 173/90 |
| 9,453,321 B2 | * | 9/2016 | Hartman | B25D 1/16 |
| 2011/0225800 A1 | | 9/2011 | Lacy et al. | |
| 2012/0189391 A1 | | 7/2012 | Hamman | |
| 2012/0261456 A1 | | 10/2012 | Lacy et al. | |
| 2015/0217437 A1 | | 8/2015 | Thomaschefsky | |

* cited by examiner

*Primary Examiner* — Anna K Kinsaul
*Assistant Examiner* — Veronica Martin
(74) *Attorney, Agent, or Firm* — Boudwin Intellectual Property; Daniel Boudwin

(57) ABSTRACT

A stake implanting tool is provided. The stake implanting tool includes an elongated body designed with angled aluminum. The elongated body has a lower end and an upper end. A handle is slidably disposed within a channel defined by the elongated body. A flat stake driver is operably connected to the handle. A slot is disposed on the elongated body. When the handle is in the resting position, a stake is placed within the slot. The stake is retained to the slot by a spring loaded pin. A rounded base disposed on a lower end of the elongated body supports the device on the land mat. An aperture is disposed on the rounded base. In operation, the handle is slid down the channel, the stake is ejected through the aperture into the ground. A stopping guard prevents the stake from being implanted too deep into the ground.

10 Claims, 4 Drawing Sheets

STAKE IMPLANTING TOOL

CROSS REFERENCE TO RELATED APPLICATIONS

This application claims the benefit of U.S. Provisional Application No. 62/994,394 filed on Mar. 25, 2020. The above identified patent application is herein incorporated by reference in its entirety to provide continuity of disclosure.

BACKGROUND OF THE INVENTION

The present invention relates to an agricultural tool. More specifically, the present invention provides a stake implanting tool that has an elongated body with a slidable handle that allows for wooden stakes to be inserted directly into the ground.

After prolonged exposure to wind and water, land surface can start to erode. Land erosion is the process by which material on the surface of the land is dislodged and moved. Eroding land is a dangerous hazard and decreases soil fertility, which can negatively affect the land's ability to grow vegetation. A way to protect against land erosion is to apply an anti-erosion mat to the eroded area. Anti-erosion mats can provide the eroded area protection against further exposure to the elements and keeps the remaining soil in place. Moreover, the anti erosion mats can provide landowners with the ability to grow new vegetation. Securing the anti-erosion mats to the land can be a time consuming process that requires a high amount of physical effort.

In order to properly secure the anti erosion mats to the land, individuals must implant stakes through the anti-erosion mats and into the ground, individuals normally must get onto their hands and knees or bend over to properly implant the stakes. Having to constantly get up and down or bend can result in a significant injury to the individual implanting the stakes. Additionally, the individuals must manually hammer the stakes into the ground. When the surface is rigid and firm, having to manually hammer each stake into the ground can be exhausting for the individual and potentially lead to them suffering a serious injury.

Additionally, not all types of land erosion are the same. Some of the land erosion can span across a large surface area of land. This can require an anti-erosion mat that covers land erosion spanning over hundreds of feet. For individuals to manually implant an appropriate amount of stakes to secure the anti-erosion mat of that size they have to implant a high number of stakes into the ground. With such a mat, this can require even more time and energy for an individual to accomplish.

When manually implanting stakes, individuals must be careful so that the stake gets implanted correctly. This requires that the individual keeps the stake and the hammer in a proper position relative to the mat and the ground. If the stake is not properly implanted into the ground, the mat could be damaged. Moreover, when in individual drives the stake too deep into the ground, that too can damage the mat and render the stake ineffective. If the mat is damaged, then the mat will not be able to facilitate erosion control or any function that the mat is designed to perform. Additionally, some of the damage to the mat can come from the stake. A commonly used stake is composed of a metal wire. These metal wire stakes can tear and damage the mats. Moreover, the metal wire stakes are not biodegradable. This requires the metal wire stakes to be removed from the ground once the mat no longer needs to be secured to the ground. When the metal wire stakes are not removed, then it can lead to environmental harm. Alternatively, having the stakes composed from a biodegradable material will eliminate the need to remove the stakes because they will be able to decompose.

Therefore, there is a defined need amongst the known prior art references for a stake implanting tool that provides a method with a slidable handle that implants wooden, biodegradable stakes directly into a ground surface to secure land mats to areas of need.

SUMMARY OF THE INVENTION

In view of the foregoing disadvantages inherent in the known types of stake implanting tools now present in the known art, the present invention provides a new stake implanting tool wherein a user can slide a handle along an elongated body to implant a biodegradable stake into the ground at the proper depth to secure a land mat to the surface of the ground.

It is therefore an object of the present invention to provide a stake implanting tool that allows the user to implant a stake into the ground while in a standing position. When individuals must implant a stake into the ground in order to secure a land mat to an area that requires treatment, they often must get onto their hands and knees and implant the stake by hand. Being in such a position can not only cause the individual discomfort, but it also may lead to prolonged health issues. This can be exacerbated by an individual who must implant an abundance of the stakes into the ground. Moreover, when the land is firm and rigid, having to manually insert the stakes in the ground by hand can lead to further discomfort to the individual. However, the ability to be in a standing position will limit the user's chances of developing any health issues from having to get into an unfavorable position and having to implant a stake into the ground by hand.

Another aspect of the present invention is the slidable handle. The user can slide the handle along the elongated body to implant a stake into the ground. By sliding the handle, the user can implant the stake into the ground. This allows users to properly secure a land mat to a desired area without having to use a hammer to manually implant the stake. Moreover, the time that it takes a user to place a stake into the slake implanting tool and then implant it into the ground is significantly less than the commonly used methods. This allows users to implant stakes spanning over a large surface area in less time and with a limited chance that they suffer any injury.

Yet another aspect of the present invention is the stopping guard. The stopping guard prevents the handle from implanting the stake too deep into the ground. When the stake is too deep into the ground it can damage the land mat and not properly secure the land mat to the ground. A damaged or ineffective land mat will not help treat the surface from the erosion or any other harm it is experiencing. The stopping guard is design to implant the stake at the most effective depth that secures the land mat the surface and does not cause the land mat any damage.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
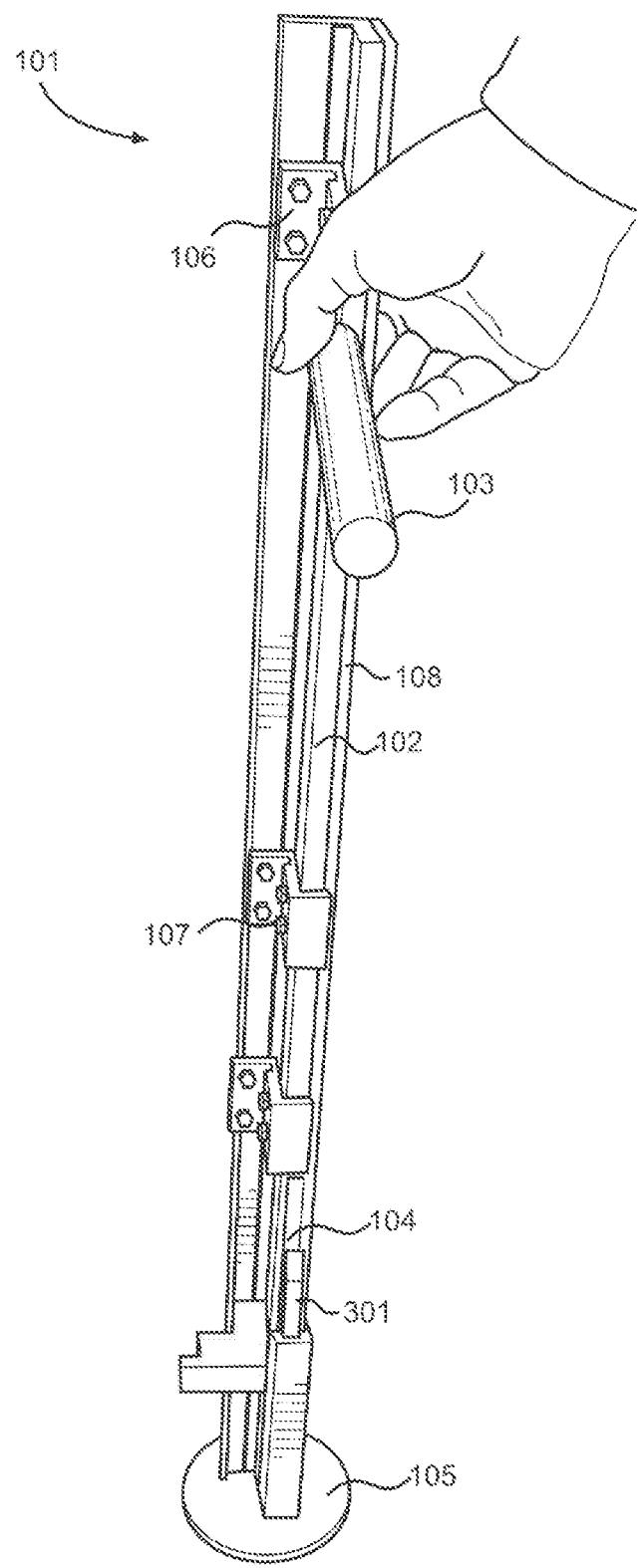
FIG. 1 shows a perspective view of an embodiment of the stake implanting tool.

Reference is made herein to the attached drawings. Like reference numerals are used throughout the drawings to depict like or similar elements of the stake implanting tool. For the purposes of presenting a brief and clear description of the present invention, the preferred embodiment will be discussed is the stake implanting tool with an elongated body and a slidable handle.

FIG. 1 shows a perspective view of an embodiment of a stake implanting tool. The stake implanting tool 101 comprises an elongated body, a handle 103, and a rounded base 105. The elongated body is angled. In this embodiment of the stake implanting tool 101, the elongated body is composed from angled aluminum. The angled aluminum makes the stake implanting tool 101 lightweight for the user to carry. The elongated body comprises an upper end and a lower end. The stake implanting tool 101 is designed to allows users to stand in an upright position as they implant stakes into the ground.

The handle 103 is affixed to the top of a flat vertical bar 102. In this embodiment of the stake implanting tool 101, the handle 103 is cylindrical in shape. A pair of opposing brackets 108 are disposed along the opposing edges of the elongated body. The flat vertical bar 102 is slidably secured within the pair of opposing brackets 108. When the user raises or lowers the handle 103 along the elongated body, the flat vertical bar 102 will correspondingly slide upward or downward along the pair of opposing brackets 108.

The handle 103 is constrained by two opposing guards. A first guard is the resting guard 106. The resting guard 106 is disposed on the elongated body above the handle 103. A second guard is the stopping guard 107. The stopping guard 107 is disposed on the elongated body below the handle 103. The handle 103 is unable to move along the elongated body beyond the resting guard 106 and the stopping guard 107.

The rounded base 105 is disposed on the lower end of the elongated body. The rounded base 105 is configured to directly contact the ground surface when the stake implanting tool 101 is in use. Moreover, a slot 104 is disposed on side of the elongated body. The slot 104 is located toward the lower end of the elongated body. The slot 104 is sandwiched between the stopping guard 107 and the rounded base 105. The slot 102 is configured to receive a stake 301 therein. The rounded base 105 enables the stake implanting tool 103 to be supported on the ground surface. The support that the rounded base 105 provides the stake implanting tool 101 allows the stake 301 to be properly implanted into the ground.

When the handle 103 is raised towards the resting guard 106, the stake implanting tool 101 will be in a loading configuration. While in the loading position, a user can insert the stake 301 into the slot 104. The stake 301 will be inserted into the slot 104 prior to implantation. Once the stake 301 is secured into the slot 104, the handle 103 may be lowered towards the stopping guard 107. The lowering of the handle 103 will allow for the stake 301 to be implanted into the ground. When the handle 103 is completely lowered, the stake implanting tool 101 will be in an implanting configuration.

Figure 2B:
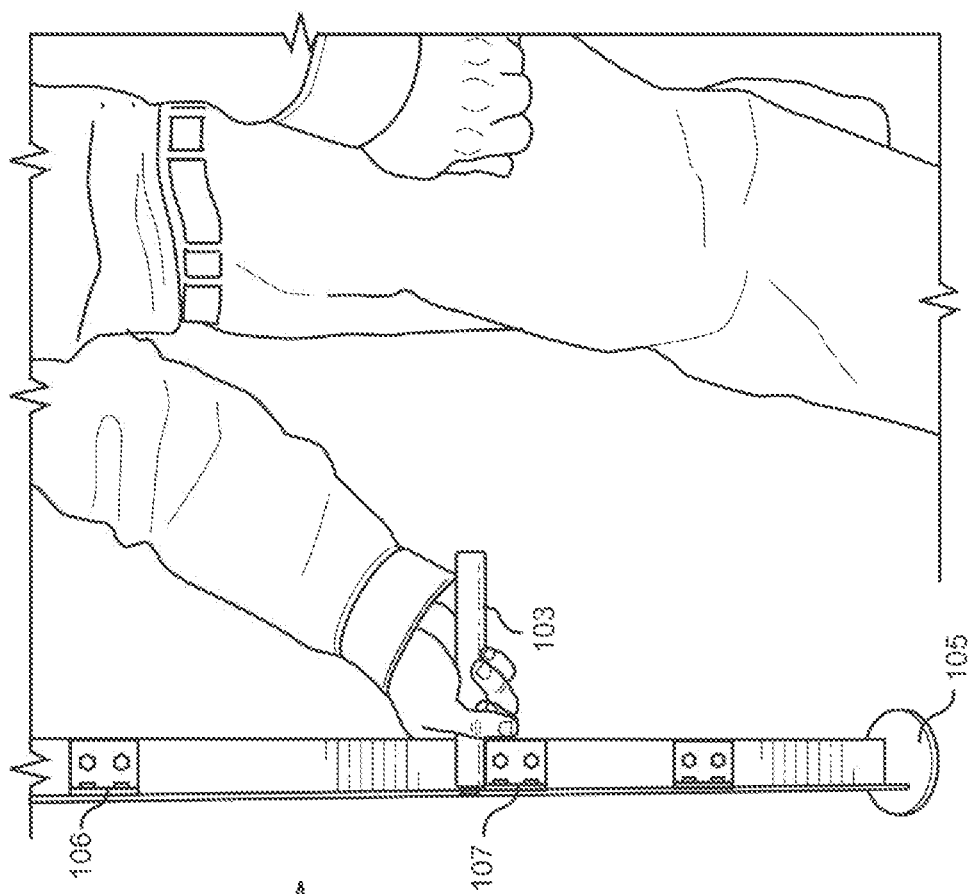
FIG. 2B shows a perspective view of an embodiment of the stake implanting tool with a handle in an implanting configuration.
Figure 2A:
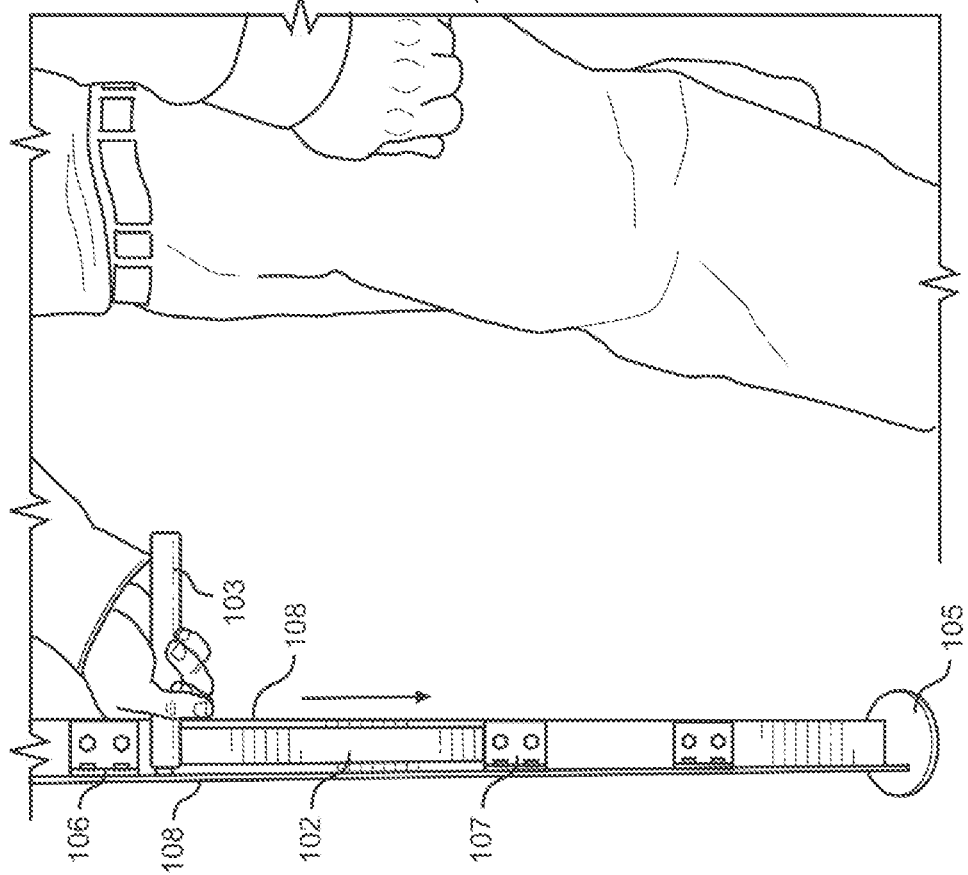
FIG. 2A shows a perspective view of an embodiment of the stake implanting tool with a handle in a loading configuration.

FIG. 2A and FIG. 2B shows a perspective view of an embodiment of the stake implanting tool in a loading configuration; and shows a perspective view of an view of an embodiment of the stake implanting tool in an implanting configuration, respectively. Prior to implantation of a stake, the stake implanting tool 101 will be in a loading position, in the loading position, the handle 103 will be positioned towards the resting guard 106 at the upper end of the elongated body. In the loading position, a user will be able to insert the stake into the slot 104. The flat vertical bar 102 is configured to be above the inserted stake. Once the stake is inserted into the slot 104, the user will be able to slide the handle 103 downwardly towards the stopping guard 107. As the handle 103 is lowered, the flat vertical bar 102 will correspondingly move downward along the pair of opposing brackets 108. The flat vertical bar 102 will apply a force onto the stake. The flat vertical bar 102 will eject the stake from the stake implanting tool 101 and implant the stake into the desired location on the ground. The stopping guard 107 will stop the handle 103 from being lowered beyond the stopping guard 107. The stopping guard 107 will prevent the flat vertical bar 102 from applying a force onto the stake, after the stake is ejected from the stake implanting tool 101. This will prevent the stake from being implanted into the ground beyond the desired depth. Preventing the stake 301 from being implanted beyond the proper depth will reduce the amount of tearing that can occur in the fabric of the item being secured to the ground. The stopping guard 107 maximizes the efficiency of stake implanting when the stake implanting tool 101 is used. Once the stake is implanted into the ground, the user can raise the handle 103 back towards the resting guard 106 to return the stake implanting tool 101 to the loading configuration.

Figure 3:
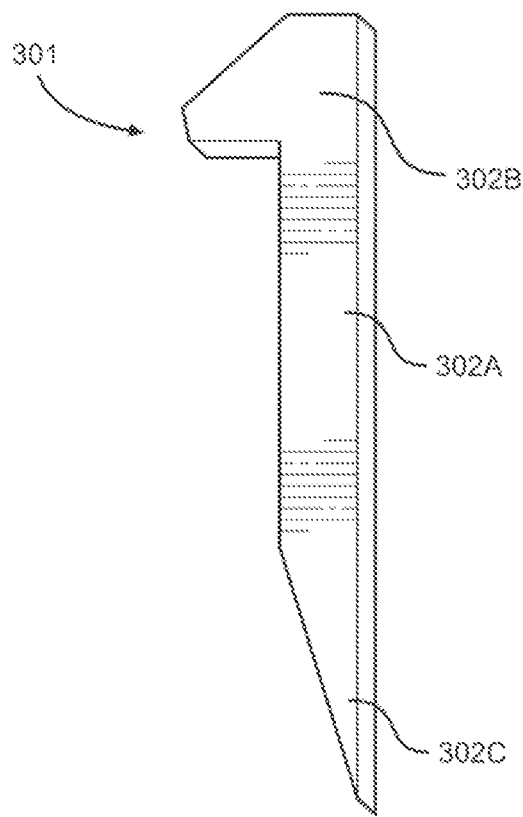
FIG. 3 shows a perspective view of an embodiment of the wooden stake.

FIG. 3 shows a perspective view of an embodiment of a stake. The stake 301 is composed from a biodegradable material. In this embodiment, the stake 301 is composed of wood. The stake 301 comprises a body 302A. The body 302A is configured to fit into the slot on the stake implanting tool. The body 302A has two opposing ends. A first end includes a spike 302C. When the stake 301 is inserted into the slot, the spike 302C will be downwardly oriented. The spike 302C will penetrate the ground surface and any object the user wants to secure to the ground surface. A second end includes a notch 302B. The notch 302B is designed to fit within the slot and exit the stake implanting tool via the rounded base. The notch 302B further comprises a top surface large enough for the flat vertical bar to apply a force on to the stake 301. That force will eject the stake 301 from the stake implanting tool. Additionally, the notch 302B provides users with an area of the stake 301 to grasp to insert it into the slot. Moreover, when the stake 301 is inserted into the ground, the notch 302B will be visible. This allows an individual to grasp the notch 302B to remove the stake 301 from the ground, if necessary.

Figure 4:
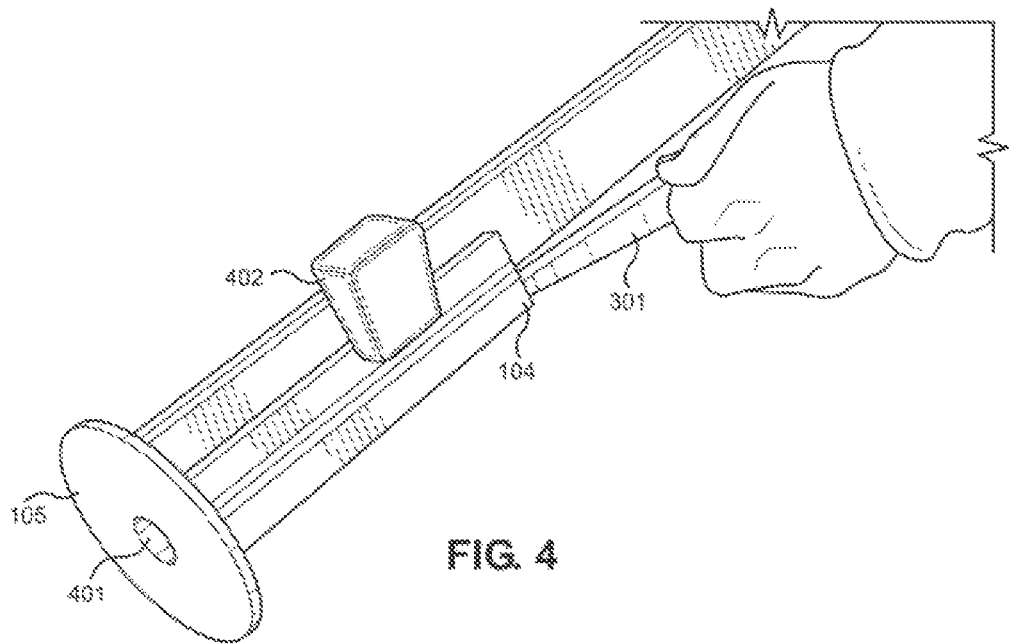
FIG. 4 shows a bottom view of an embodiment of the stake implanting tool.

FIG. 4 shows a bottom view of an embodiment of a stake implanting tool. An aperture 401 is disposed on the bottom face of the rounded base 105. The aperture 401 is connected to the slot 104, such that a stake 301 can be ejected from the stake implanting tool 101 via the aperture 401. The aperture 401 is large enough for the notch of the stake 301 to pass through. A spring housing 402 is disposed on the elongated body. The spring housing 402 is located between the slot 104 inlet and the rounded base 105. A spring-loaded pin within the spring housing 402 retains the stake 301 within the slot 104 prior to implanting. The spring-loaded pin prevents the stake 301 from falling out of stake implanting tool 101. During implantation of the stake 301, the round base 105 is in direct contact with the ground. A user will move the handle 103 from the resting guard downwardly towards the stopping guard. As the handle 103 moves the flat stake driver will push down on the notch 302B of the stake 301. The stake 301 will pass through the aperture 401 to exit the stake implanting tool 101 and implant the stake 301 into the ground.

Figure 5:
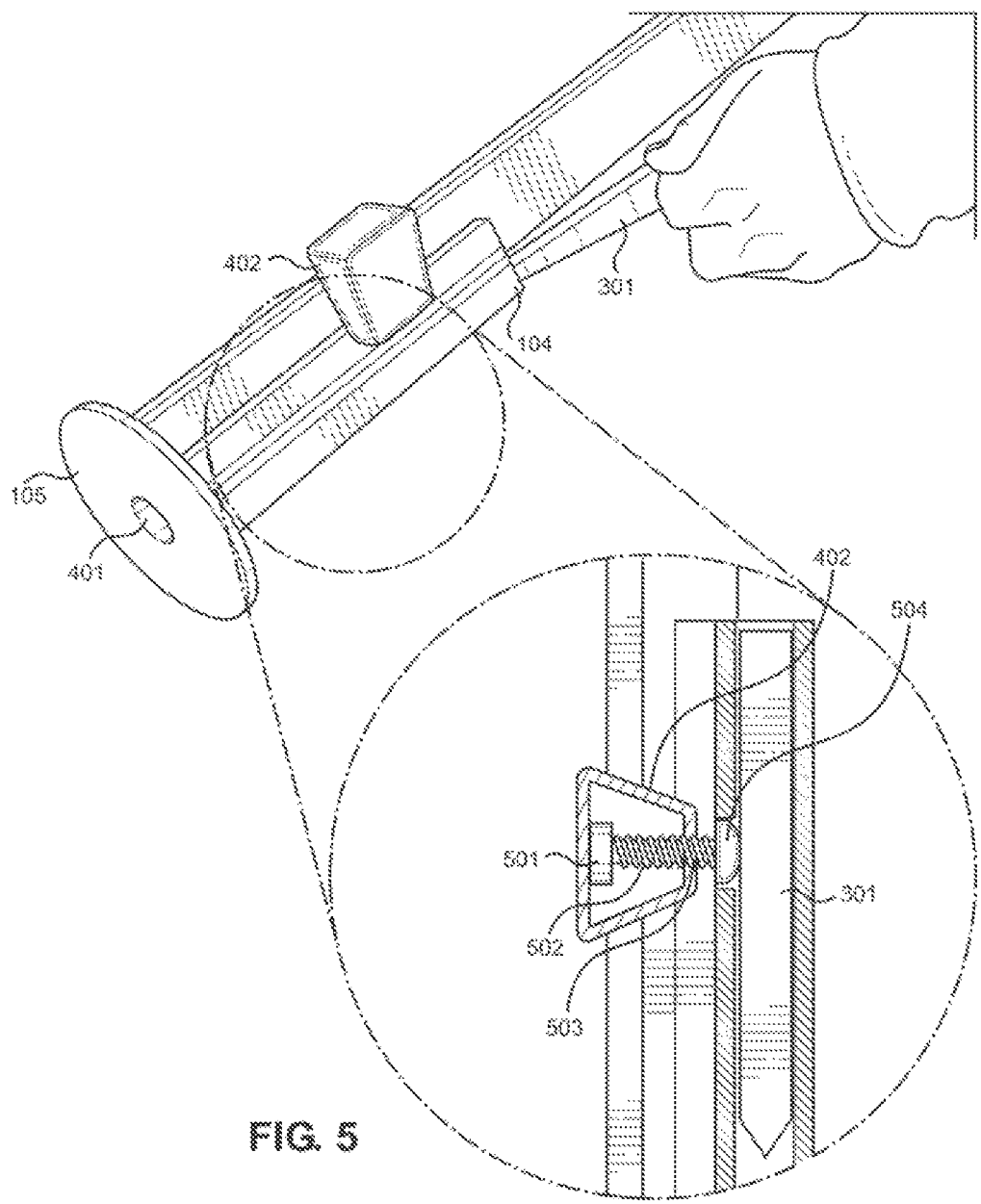
FIG. 5 shows a cross-sectional view of an embodiment of the stake implanting tool.

FIG. 5 shows a cross-sectional view of an embodiment of a stake implanting tool. The stake implanting tool 101 comprises the spring housing 402. The spring housing 402 is disposed on the elongated body below the slot 104 and above the rounded base 105. The spring housing 402 comprises a pin 503 and a spring 502. The spring 502 encases the pin 503. The pin 503 further comprises a rounded pin head 504. The rounded pin head 504 is not encased by the spring 502. The pin 503 is secured to the interior of the spring housing 402 via a guide block 501. When there is no stake 301 inserted into the slit 104, the pin 503 is at rest. At rest, the pin 503 is fully extended. When the pin 503 is fully extended, the rounded pin head 504 will be in within the interior of the slot 104. In operation, the stake 301 is inserted into the slot 104. When the stake 301 is inserted, the stake 301 will apply a force that will push on the rounded pin head 504. When the rounded pin head 504 is pushed by the stake 301, the pin 503 will retract into the spring housing 402 and compress the spring 502 towards the guide block 501. While compressed, the spring 502 will generate a force in the opposite direction that the pin 503 retracts. That spring force will be applied to the stake 301 by the rounded pin head 504. The force from the stake 301 and the opposite force from the spring 502 will secure the secure the stake 301 within the slot 104.

When a user lowers the handle 103 towards the stopping guard 107, the flat vertical bar 102 will apply a vertical force to the stake 301. The vertical force will push down on the stake 301 and move the stake 301 down the slot 104. As the vertical force is applied to the stake 301, the stake 301 will pass through the aperture 401 on the rounded base 105. Following the ejection of the stake 301 from the slot 104, the pin 503 and spring 202 will return to the extended resting position.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stake implanting tool, comprising:
   an elongated body, wherein the elongated body further comprise an upper end, a lower end, and a pair of opposing edges;
   a pair of opposing brackets are disposed along the pair of opposing edges on the elongated body;
   a handle;
   a flat vertical bar, wherein the handle is affixed to the top of the flat vertical bar;
   the flat vertical bar is slidable between the pair of opposing brackets;
   a resting guard is disposed on the elongated body, wherein the resting guard is positioned above the handle;
   a stopping guard is disposed on the elongated body, wherein the stopping guard is positioned below the handle;
   a rounded base is disposed on the lower end of the elongated body;
   an aperture is disposed on the bottom of the rounded base;
   a slot is disposed on the elongated body, wherein the slot is below the stopping guard and above the rounded base;
   a spring housing further comprising;
      a pin secured to an interior area of the spring housing;
      the pin includes a rounded pin head;
      a spring encasing the pin below the rounded pin head;
   whereby the spring housing encases the pin;
   the spring housing includes a top face, a bottom face, a front face, a rear face, and at least one side face, thereby defining the internal area of the spring housing;
   wherein the rear face of the spring housing is disposed on the lower end of the elongated body;
   whereby the spring biases the rounded pin head to extend into the slot;
   the rounded pin head directly contacts a stake within the slot, whereby the stake compresses the spring and displaces the rounded pin head towards the interior area of the spring housing, thereby securing the stake therein; and
   the spring housing is disposed on the elongated body, wherein the spring housing is below the slot and above the rounded base.

2. The stake implanting tool of claim 1, wherein the handle is constrained by the resting guard and the stopping guard.

3. The stake implanting tool of claim 1, wherein the handle can slide about the elongated body.

4. The stake implanting tool of claim 1, wherein the handle is in a loading configuration when the handle raised to the resting guard.

5. The stake implanting tool of claim 1, wherein the flat vertical bar correspondingly slides with the handle, whereby the flat vertical bar will slide upward or downward along the pair of opposing brackets.

6. The stake implanting tool of claim 1, whereby the flat vertical bar applies a downward force upon an inserted stake when the handle lowers towards the stopping guard.

7. The stake implanting tool of claim 1, wherein the aperture is operably connected to the slot.

8. The stake implanting tool of claim 6, wherein the inserted stake ejects through the aperture disposed on the bottom of the rounded base when the flat vertical bar applies the downward force to the inserted stake.

9. The stake implanting tool of claim 1, wherein the stopping guard prevents the flat vertical bar from implanting the inserted stake beyond a desired depth.

10. The stake implanting tool of claim 1, wherein the stake inserted into the slot will apply an initial force against the rounded pin head causing the pin and the spring to retract into the spring housing; whereby the spring will generate an opposing force against the stake in the opposite direction of the initial force, resulting in the stake remain in a static state until a downward force is applied to the stake.

\* \* \* \* \*